United States Patent Office 2,705,156
Patented Mar. 29, 1955

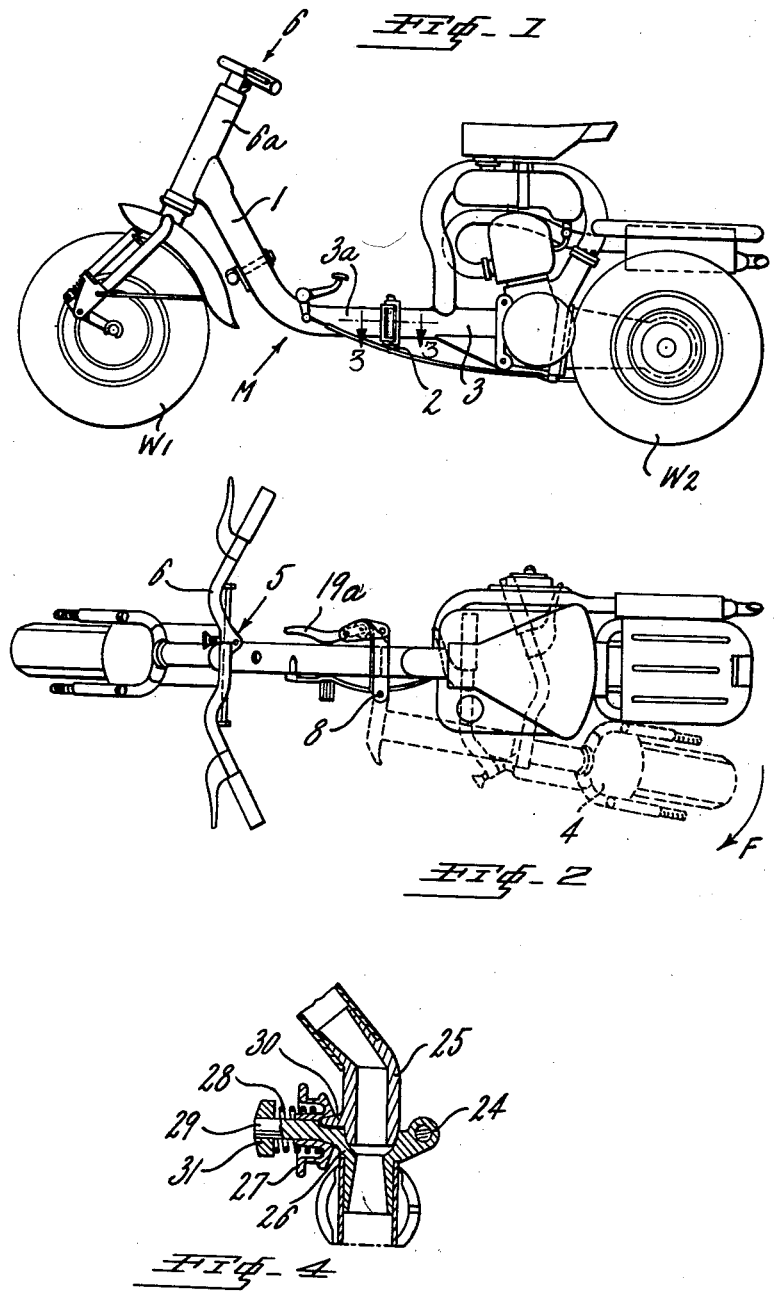

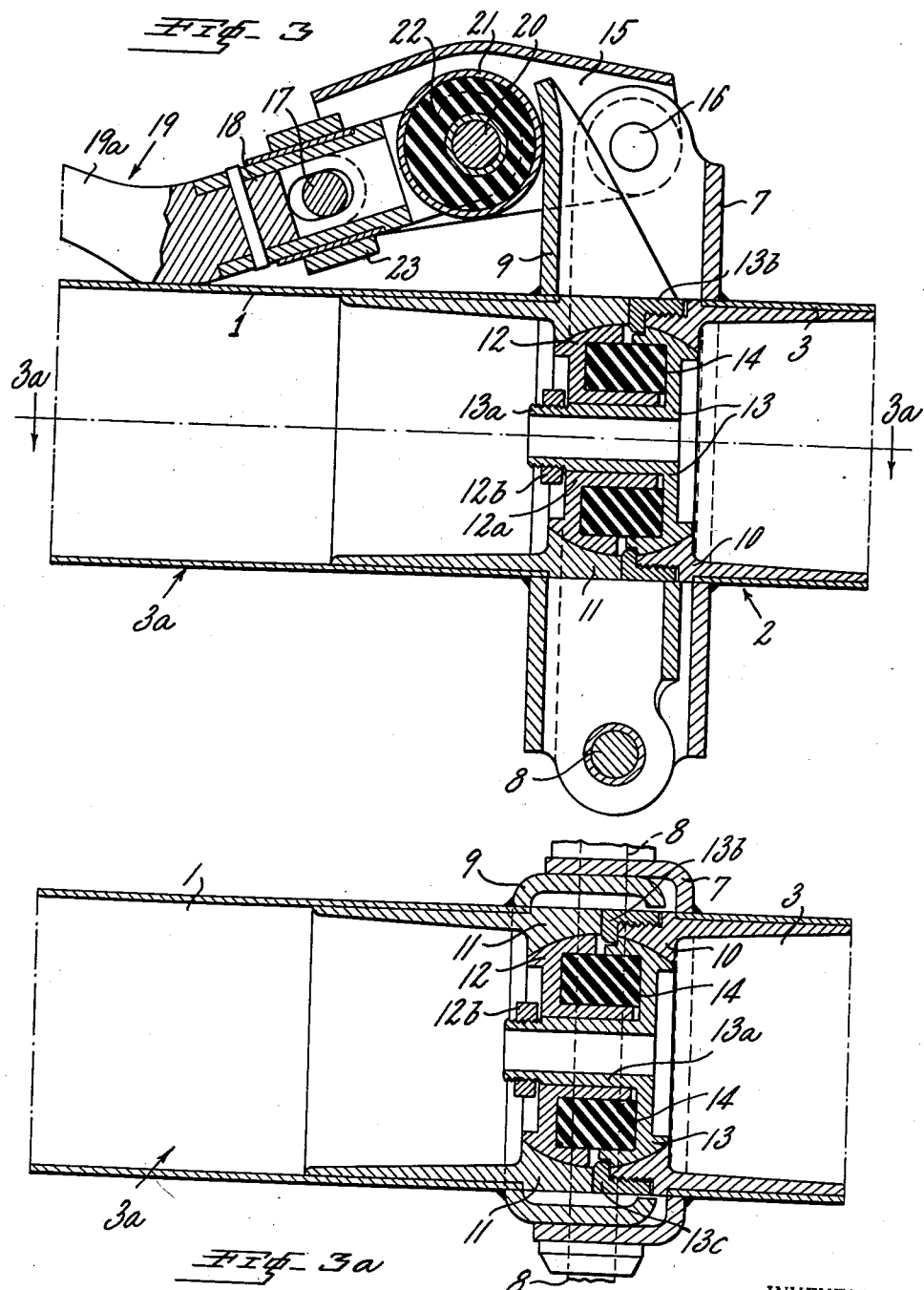

2,705,156

FOLDABLE MOTORCYCLE

Pier Luigi Torre, Milan, Italy

Application August 14, 1950, Serial No. 179,209

Claims priority, application Italy December 28, 1949

4 Claims. (Cl. 280—287)

This invention relates to motor vehicles, and more particularly to a collapsible or foldable motorcycle.

It is an object of the present invention to provide means affording the folding of a motorcycle into a compact load whereby the motorcycle can be handled and moved about with ease and subsequently reassembled or unfolded for use.

It is another object of the present invention to provide means facilitating collapse of a motorcycle to its minimum overall dimensions, with great speed and by simple swinging manipulation.

It is a further object of the present invention to provide a motorcycle of the aforesaid character which is particularly desirable for special application, such as use by the military, where it is essential that the motorcycle be easily transported about as a compact mass or load to be carried and subsequently made ready for use by simple operation and in a relatively short period of time.

Briefly described, a motor vehicle according to the present invention comprises a frame with a longitudinal central beam provided with hinged joint means and having a similar joint connecting the handlebar sections of the steering post, so as to facilitate the folding of the forward half of the vehicle on the rearward half of the motorcycle, with the successive folding of one of the handlebar sections of the steering post, thereby reducing to less than half the overall dimensions of the motorcycle in unfolded condition.

The above and still further objects of the present invention will become apparent from the following detailed description of the invention taken in conjunction with the drawings, wherein:

Fig. 1 is a side elevational view of a motorcycle constructed according to the present invention and in the running position.

Fig. 2 is a plan view of the motorcycle illustrated in Fig. 1 wherein in dotted lines is shown the forward half section of the motorcycle in folded position and disposed in side by side relation with the rearward half section of the motorcycle.

Fig. 3 illustrates, on an enlarged scale, a horizontal section of the hinge joint of the frame together with locking means therefor taken on line 3—3 of Fig. 1.

Fig. 3a is a sectional view taken along lines 3a—3a of Fig. 3.

Fig. 4 is a horizontal section of the hinge joint on the handlebar with corresponding locking means.

Referring now with particularity to the drawings, there is shown a motorcycle M according to the present invention, which is provided with a frame having a longitudinal central beam 3a divided in two halves, namely a forward half section 1 and a rearward half section 3 jointed together by a hinge joint 2. The remaining structure of the motorcycle per se may be of any type.

Hinge joint 2 is constructed to mount the forward half 1 of the motorcycle M for swinging movement about hinge 2 until it reaches the position 4 illustrated in phantom lines in Fig. 2. In the folded position illustrated, the two motorcycle wheels $W_1$, $W_2$ are positioned side by side and take up with the remainder of the motorcycle very limited space, while the respective axes of the wheels are substantially in alignment. In order to prevent one of the handlebar half-sections from standing out beyond the outline of the other portions of the motorcycle thus folded, one half-section of the handlebar 6 of the steering post 6a is also foldable over the other half-section by swinging same about the pivot of a vertically disposed hinge, designated generally by the numeral 5 in Fig. 2.

The hinge joint 2 provided on the frame is shown in greater detail in Fig. 3. As clearly shown in Figs. 3 and 3a the fixed half section or portion 3 of the frame is provided with a U-shaped member 7 positioned crosswise to the longitudinal central frame beam 3a and carrying a vertical pin 8 constituting also the swinging pivot of the hinge. Conformably receivable with U-shaped member 7 is a rigid member 9 which is secured to the forward half section 1 of the frame. The member 9 is also U-shaped and swingable about pivot 8. Each of the two half sections 1 and 3 of the frame are formed adjacent the pivoted ends with a spherical seat, respectively indicated in the drawings by the numerals 10, 11. Disposed within the seats is an assembly having an external profile formed as portions of spherical surfaces fitting the surfaces of the previously mentioned seats 10, 11. The assembly is formed by two rigid pieces 12 and 13 which may slide axially relative to each other and are spaced apart by an elastic block 14. Accordingly, when the frame is in the operating and unfolded position with the two frame half sections 3 and 1 extended and carrying the spherical seats 10 and 11 in alignment with each other, the spherical parts of the pieces 12 and 13, urged by the pressure of the elastic block 14, are brought to bear against the respective spherical seats 11 and 10, thus ensuring a perfect centering of the two frame portions and the desired rigidity of the frame through the disclosed joint.

As clearly illustrated in Fig. 3 the piece 13 is secured to the rearward half of the frame by a collar 12b, which is threaded on a sleeve extension 13a of member 13 which is thus detachably supported on the rearward half frame section 3, said collar 12b further bearing against adjacent portions of sleeve extension 12a of piece 12. The assembly of the rigid pieces 12, 13 with the elastic block 14 supported therebetween, is further secured by means of a nut or threaded sleeve 13b having a flange 13c which engages piece 10 and bears against adjacent portions of the piece 13.

For locking the two frame half sections 1 and 3, in the aligned position, there is provided a hand-operated lever system 19 comprising a bracket 15 having one end hinge mounted adjacent the bight of U-shaped member 7 by means of a pin 16. The bracket member 15 carries adjacent one end another pin 17 on which is pivoted a handle lever extension 18 terminating at one end in a handle 19a proper and at the opposite end in a seat for a pin 20 about which is freely rotatable a roller 21. Roller 21 encloses elastic core 22.

The roller 21 is adapted to slide, during the locking operation of the motorcycle frame, on the external wall of U-shaped member 9 to urge the latter with the associated frame half section 1 into an extended position with respect to frame half section 3, thereby ensuring the continuity and rigidity of the frame through said joint.

More precisely, when it is desired to bring the motorcycle into operative and unfolded position, the forward half section 1 of the frame and the components associated therewith are swung in the direction of arrow F (Fig. 2), while lever 18 and handle 19a will be swung about pin 16 to a position almost perpendicular to that shown in Fig. 3. Upon frame half section 1 being brought in alignment with the frame half section 3, lever system 19 together with its bracket member 15 and the components carried thereby will be rotated by means of handle 19a to the position shown in Figs. 2 and 3 and by this movement roller 21 will be brought into engagement with the external surface of member 9. Upon passing the dead center constituted by the position in which the three pins 16, 17 and 20 are aligned, roller 21 will be loaded or tensioned by the effect of the forced compression of resilient core 22, thus effectuating a quick snap action of said roller and of the pieces connected therewith until handle 19a comes in contact with section 1 and is stopped thereby.

The pressure exerted by roller 21 against the wall of member 9 can be regulated by varying the position of the lever arm, which is facilitated by adjustably mounting a part of lever 18 on a support 23 carrying pin 17 constituting the lever fulcrum.

The handle bar pivot is formed by a hinge comprising a pin 24 carried by an extension of portion 26 of the stationary handlebar half section of the steering post and on which there is fitted, freely rotatable, a movable half section 25 of the handle-bar of the steering post.

The end of said movable half section 25 terminates with a portion of spherical surface adapted to fit in a corresponding spherical seat carried by the stationary portion 26.

Projecting from the side opposite that of the extension carrying pin 24 is an extension 29 in the form of a pin, provided with a cavity adapted to receive a tooth or projection 30 secured to the movable handlebar section 25. On pin 29 there is fitted a slidable cap 27 which is urged into a locking position by a spring 28 coiled about pin 29 and retained by a nut 31, the latter being screwed on the threaded end of said pin 29.

The external surface of cap 27, facing the handle-bar, is conical so that when movable handlebar section 25 of the steering post is swung outwardly to make the vehicle ready for operation, at a certain point of its swing, tooth 30 of said movable section will come to bear on the conical surface of cap 27 and will slide on same displacing the cap 27 against the reaction of spring 28 until the tooth reaches its seat provided in pieces 27 and 29, whereupon cap 27, no longer pressed, will snap into the locking position under the action of spring 28, thus ensuring the desired locking action.

As is apparent from the preceding description, the operation for folding the vehicle of the present invention so as to reduce same to a minimum in its overall dimensions, as well as the operation for putting the vehicle in operative condition for driving, are very simple, quick and easily performable even by people having no particular mechanical knowledge. This constitutes a remarkable advantage and offers the possibility of many novel and useful applications of motor-cycles.

Although only one specific embodiment of the invention has been described and shown in the drawing, it should be noted that the invention may be realized in modified form and adaptations of the arrangements herein disclosed may be made as may readily occur to persons skilled in the art without constituting a departure from the spirit and scope of the invention as defined in the objects and in the appended claims.

Having thus described the invention, what is claimed as new and desired to be secured by Letters Patent, is:

1. In a motorcycle having its frame in half sections, said frame including a longitudinal central beam, each of the frame half sections supporting one of the motorcycle wheels, a hinge joint comprising two embraced U-shaped members arranged transversely to the central frame beam of said frame and in a substantially horizontal plane and a hinge pin secured to either end of both said members for pivoting the latter about a common axis, a lever secured to the opposite end of one of said members, and means on said lever arranged to bear against the other of said members for locking said frame half sections in aligned position, whereby said frame half sections may swing about said hinge pin into a folded position of said motorcycle wherein the two motorcycle wheels are positioned in side-by-side relation with respect to each other and said U-shaped members support said motorcycle in upstanding position.

2. In a motorcycle according to claim 1, including resilient aligning means carried by one of said frame half sections for engaging the other of said frame half sections in their aligned position, thereby ensuring perfect alignment of said frame half sections.

3. In a motorcycle according to claim 1, wherein one of said frame half sections is provided with two spaced rigid pieces removably mounted thereon, at least one of said pieces including a spherical seat, a resilient block supported between said two spaced rigid pieces, and means on said other frame half section provided with a complementary spherical seat, whereby said frame half sections are held in aligned position.

4. In a motorcycle according to claim 1, wherein said means on said lever includes a resilient roller, and said other of said members includes means on the external wall thereof adjacent said opposite end of said one of said members and cooperating with said roller, whereby said lever snaps into locking position.

References Cited in the file of this patent

UNITED STATES PATENTS

| Number | Name | Date |
|---|---|---|
| 557,035 | Smith | Mar. 24, 1896 |
| 1,437,204 | Seger | Nov. 28, 1922 |
| 1,584,314 | Mamiya | May 11, 1926 |
| 2,101,337 | Komenak | Dec. 7, 1937 |
| 2,394,494 | Schwinn | Feb. 5, 1946 |
| 2,427,603 | Higgins | Sept. 16, 1947 |